United States Patent [19] [11] 4,424,298
Penzel et al. [45] Jan. 3, 1984

[54] PREPARATION OF CONCENTRATED POLYACRYLATE DISPERSIONS

[75] Inventors: Erich Penzel, Ludwigshafen; Guenter Eckert, Limburgerhof; Lothar Heider; Lothar Wuertele, both of Ludwigshafen; Werner Schackert, Schifferstadt, all of Fed. Rep. of Germany

[73] Assignee: BASF Aktiengesellschaft, Rheinland-Pfalz, Fed. Rep. of Germany

[21] Appl. No.: 372,799

[22] Filed: Apr. 28, 1982

[30] Foreign Application Priority Data

May 20, 1981 [DE] Fed. Rep. of Germany ....... 3119967

[51] Int. Cl.$^3$ .............................................. C08K 5/01
[52] U.S. Cl. ..................................... 524/747; 524/748
[58] Field of Search ............... 524/543, 547, 556, 563, 524/565, 156, 157, 166, 561, 560, 562, 747, 748, 745; 523/305; 526/209, 214

[56] References Cited

U.S. PATENT DOCUMENTS

| | | | |
|---|---|---|---|
| 2,655,496 | 10/1953 | Adams | 260/85.5 |
| 3,202,638 | 8/1965 | Van Ess | 260/78.5 |
| 3,637,563 | 1/1972 | Christena | 523/305 |
| 3,644,258 | 2/1972 | Moore et al. | 524/162 |
| 4,018,737 | 4/1977 | Seer et al. | 524/747 |
| 4,029,624 | 6/1977 | Burkhard et al. | 524/747 |
| 4,117,237 | 9/1978 | Longley et al. | 524/747 |
| 4,130,523 | 12/1978 | Hoy et al. | 526/67 |
| 4,148,746 | 4/1979 | Klemmensen et al. | 252/316 |

FOREIGN PATENT DOCUMENTS

87405/75   6/1977   Australia .
1261672   1/1972   United Kingdom .

Primary Examiner—Josephine Barr
Attorney, Agent, or Firm—Oblon, Fisher, Spivak, McClelland & Maier

[57] ABSTRACT

Emulsion copolymerization of acrylic or methacrylic acid esters with from 0.3 to 10% by weight of $\alpha,\beta$-monoolefinically unsaturated monocarboxylic acids and/or dicarboxylic acids and/or their amides, with or without up to 25% by weight of styrene, acrylonitrile, vinyl acetate and/or vinyl chloride, using the emulsion feed process, gives particularly concentrated copolymer dispersions if an emulsifier system of 0.01–5.0% by weight of a sulfuric acid half-ester of an oxyalkylated alkylphenol and 0.01–1% by weight of a dialkyl sulfosuccinate, where alkyl is of 6 to 18 carbon atoms, is employed and the polymerization is carried out at pH 2–6.

2 Claims, No Drawings

PREPARATION OF CONCENTRATED POLYACRYLATE DISPERSIONS

Concentrated aqueous polyacrylate dispersions with solids contents of more than 55% by weight can be prepared by a number of conventional processes. In the process of U.S. Pat. No. 3,644,258, an aqueous dispersion having a solids content of 25-30% is first prepared by emulsion polymerization of the monomers, and is then concentrated to solids contents of up to about 60% by distilling off water, accompanied by agglomeration of the polymer particles. The process is relatively involved and does not permit the copolymerization of significant amounts of polar monomers, especially acrylic acid, methacrylic acid and their amides, since otherwise relatively severe speck formation occurs during concentration. In the process of German Published Application DAS No. 1,910,488, in which a particular emulsifier concentration is maintained at the start of polymerization, polar monomers, such as methacrylamide and methacrylic acid, are used in amounts of only 1-1.3% by weight, based on total monomers, and dispersions of about 60% strength are obtained (cf. Examples 2 and 6). Higher proportions of such polar monomers cannot be used in this process without causing severe speck formation. Severe speck formation is also observed on repeating Example 1 of British Pat. No. 1,261,672, in which a multi-stage redox polymerization of a monomer mixture containing 5% by weight, based on total monomers, of acrylic acid, ultimately gives a 60% strength polyacrylate dispersion. In the process of U.S. Pat. No. 3,637,563, which is also very involved and in which an emulsion feed process using a water-in-oil pre-emulsion is employed, water-soluble auxiliary monomers, such as acrylic acid and acrylamide, are not used in the Examples in which 60-75% strength latices are obtained. It is true that polar monomers, of the type of the $\alpha,\beta$-monoolefinically unsaturated monocarboxylic acids or dicarboxylic acids and their amides, are mentioned amongst many other comonomers, but nothing is said concerning their amounts, and once again products with a very high speck content are obtained if these polar comonomers are used in proportions of more than about 2%. Finally, U.S. Pat. No. 4,130,523 discloses a process for the preparation of highly concentrated polyacrylate latices, in which a seed latex is first prepared in aqueous emulsion, and part of this latex is taken from the reaction vessel, then returned continuously thereto at a later point in time during the polymerization. In the Examples, acrylic acid is used as the comonomer, but in an amount of only 1% by weight based on monomers. In this prior art process, again, it is not possible to use relatively high proportions of acrylic acid or methacrylic acid.

However, for a number of applications it is desirable to have highly concentrated polyacrylate latices, with solids contents of not less than 55% by weight, which have relatively low viscosities, contain polyacrylates with relatively high proportions of polar monomers, especially $\alpha,\beta$-monoolefinically unsaturated monocarboxylic acids and/or dicarboxylic acids and/or their amides, as copolymerized units, and moreover are virtually free from specks.

We have found that concentrated polyacrylate dispersions may be prepared by polymerization of 65-97% by weight of acrylic or methacrylic acid esters of alkanols of 1 to 8 carbon atoms, 0.3-10% by weight of $\alpha,\beta$-monoolefinically unsaturated monocarboxylic acids and/or dicarboxylic acids of 3 to 5 carbon atoms and/or their amides and 0-25% by weight of monomers from the group comprising styrene, acrylonitrile, vinyl acetate and vinyl chloride, in aqueous emulsion at pH 2-6 in the presence of 0.01-5.0% by weight, based on monomers, of sulfuric acid half-esters of adducts of alkylphenols, alkyl being of 8 or 9 carbon atoms, with 5-50 moles of ethylene oxide and of conventional water-soluble free radical initiators at 30°-95° C., by the emulsion feed process, if 0.01-1% by weight, based on monomers, of a dialkyl sulfosuccinate, alkyl being of 6 to 18 carbon atoms, is used as an additional emulsifier. Using this process, virtually speck-free polyacrylate dispersions which have a polymer content of more than 55%, and which in spite of the high carboxyl group content have a low viscosity, can be obtained in a simple manner. The concentrated polyacrylate latices prepared by the novel process surprisingly give smooth continuous films, i.e. effective sealing, on leather substrates. The preparation of polyacrylate dispersions from, predominantly, acrylic and methacrylic acid esters of alkanols of 1 to 8 carbon atoms, the polymers generally containing, as copolymerized units, 0.5-5% by weight of $\alpha,\beta$-monoolefinically unsaturated monocarboxylic and/or dicarboxylic acids and/or their amides, with or without comonomers such as styrene, acrylonitrile and vinyl acetate, by the emulsion feed process at a pH below 6, with sulfuric acid half-esters of ethylene oxide adducts of alkylphenols, alkyl being of 8 or 9 carbon atoms, at 30°-95° C. in the presence of free radical initiators is known per se, but in general the polyacrylate dispersions obtained contain only from 45 to slightly above 50% by weight of the copolymers. In practice, it has not proved feasible to copolymerize, for example, 5-6% by weight of acrylic acid if polymer concentrations of above 55% by weight, for example of 60-65% by weight, are desired. If it is attempted, coagulation of the batch very easily occurs, or products which have a very high speck content and are in some cases very viscous are obtained. On the other hand, it is also well known that dialkyl sulfosuccinates, alkyl being of 6 to 18 carbon atoms, may be used as emulsifiers for emulsion polymerizations. However, it was not to be expected that on simultaneous use of the dialkyl sulfosuccinates and the sulfuric acid half-esters of the ethylene oxide adducts of alkylphenols, highly concentrated polyacrylate dispersions would be obtained which contain 0.3-10% by weight of monoolefinically unsaturated monocarboxylic and/or dicarboxylic acids and/or their amides as copolymerized units, and that the dispersions thus obtainable would be virtually free from specks, have a low viscosity, and produce good sealing on leather surfaces in spite of the high concentration of the emulsion.

As the principal monomers for the novel process, the acrylic acid and methacrylic acid esters of methanol, ethanol, isobutanol, n-butanol and 2-ethylhexanol are particularly useful; methyl acrylate, methyl methacrylate, ethyl acrylate, isobutyl acrylate, n-butyl acrylate, 2-ethylhexyl acrylate and 2-ethylhexyl methacrylate are especially preferred. Particularly useful monoolefinically unsaturated carboxylic acids are acrylic acid and methacrylic acid and particularly useful amides are acrylamide, methacrylamide and the N-alkylolamides, where alkyl is of 1 to 4 carbon atoms, e.g. N-methylolacrylamide and N-methylolmethacrylamide; maleic acid, fumaric acid, itaconic acid, maleimide, maleic acid monoamide and maleic acid diamide are also suitable comonomers. The content of these polar monomers is preferably 0.5–7.5% by weight, based on total monomers. Styrene, acrylonitrile, vinyl acetate and/or vinyl chloride are often useful for modifying the properties of the copolymers, but the presence of these monomers is not essential in every case.

The sulfuric acid half-esters are preferably derived from adducts of 20–30 moles of ethylene oxide per mole of alkylphenol. They are preferably used in amounts of 0.1–0.5% by weight, based on monomers. Preferably they, and the dialkyl sulfosuccinates, are employed in the form of their sodium salts. The dialkyl sulfosuccinates preferably have branched alkyl radicals, 2-ethylhexyl being of particular interest. Their amount is preferably 0.1–0.5% by weight, based on monomers. Other suitable dialkyl sulfosuccinates include the dihexyl, didodecyl and distearyl esters.

The conventional free radical polymerization initiators, especially alkali metal persulfates, in particular ammonium persulfate, potassium persulfate and sodium persulfate, hydrogen peroxide, peroxydicarbonates and peroxyborates can be used in the novel process, in the conventional amounts, i.e. 0.1–1.5, especially 0.3–0.7, % by weight based on monomers.

The emulsion feed polymerization process is, in general terms, familiar to a skilled worker. The monomers, in emulsified form, are fed into the polymerization vessel substantially at the rate at which they are consumed. In general, a small proportion of the monomers, initially introduced into the aqueous phase in the polymerization vessel, is used to start the polymerization by heating this initial charge, which in most cases contains 10–50%, preferably 25–50%, of the total amount of water. Simultaneously with the monomer emulsion feed, an aqueous solution of the initiator is introduced from a separate vessel. In the present case, polymerization is preferably carried out at 50°–85° C. Polymerization temperatures of below 50° C., in general of 30°–50° C., are of interest if the conventional redox catalysts are employed.

During the polymerization, the pH is preferably 3–5.

The polyacrylate dispersions prepared by the novel process have a very good shelf life, and films prepared therefrom exhibit particularly short drying times. The dispersions can also be employed in diluted form. In roller application, the dispersions obtained by the novel process exhibit improved stability, so that virtually no crusts form on the rollers. Films prepared from the dispersions are glass-clear and free from crazing. Because of the good sealing achievable on leather, the latter can generally be dressed with smaller amounts of the novel dispersions than of conventional dispersions.

In the Examples which follow, parts and percentages are by weight. The mean particle size is determined as the LT value, i.e. the light transmission, in %, of a sample diluted to 0.01% by weight, the wavelength of the incident light being 0.546 $\mu$m and the layer of sample being 2.5 cm thick.

EXAMPLE 1

1.8 parts of potassium peroxydisulfate are dissolved in 150 parts of water, and the solution is introduced into a reaction vessel which is equipped with a stirrer, a thermometer, a reflux condenser and two feed vessels. Feed I consists of an emulsion of 444 parts of iso-butyl acrylate, 120 parts of styrene, 18 parts of acrylic acid and 18 parts of methacrylamide, in 159 parts of water, the emulsifier being a mixture of 3 parts of a 40% strength aqueous solution of a $C_{14}$-$C_{15}$-paraffinsulfonate, 3 parts of a 20% strength aqueous solution of an adduct of p-isooctylphenol with 25 moles of ethylene oxide, and 0.8 part of a 75% strength aqueous solution of sodium di-n-octyl sulfosuccinate. Feed II consists of a solution of 1.2 parts of potassium peroxydisulfate in 40 parts of water.

The reaction vessel is heated to 85° C., with stirring. Feeds I and II are then introduced continuously into the reaction vessel over 3 hours. The reaction product is additionally heated for 2 hours at 90° C. and is then cooled. The dispersion obtained has a solids content of 62.8%, an LT value of 14% and a pH of 4.4. It is viscous but easily pourable and filterable. It contains neither specks nor coagulate.

COMPARATIVE EXPERIMENT 1

The procedure described in Example 1 is followed, but instead of the sulfosuccinic acid ester, an additional 3 parts of a 20% strength aqueous solution of an adduct of p-isooctylphenol with 25 moles of ethylene oxide are used. The dispersion obtained has a solids content of 62.9%, an LT value of 11% and a pH of 4.4. It is creamily viscous, is not free-flowing and cannot be filtered.

EXAMPLE 2

The procedure described in Example 1 is followed except that the initial charge consists of 180 parts of water in which 1.05 parts of ammonium peroxydisulfate are dissolved. Feed I consists of an emulsion of 672 parts of ethyl acrylate, 21 parts of acrylic acid, 7 parts of acrylamide and 1.5 parts of 25% strength ammonia in 160 parts of water, the emulsifier being a mixture of 0.5 part of a 35% strength aqueous solution of the sodium salt of the sulfuric acid half-ester of an adduct of p-isooctylphenol with 25 moles of ethylene oxide, and 1.16 parts of a 60% strength aqueous solution of sodium di-2-ethylhexyl sulfosuccinate. Feed II contains 2.1 parts of ammonium peroxydisulfate dissolved in 32 parts of water.

The polymerization is carried out by the method described in Example 1, except that 3% by volume of feed I are introduced into the heated reaction vessel, the mixture is stirred for 15 minutes and after that the procedure is as described in Example 1.

The solids content is 65.2%, the LT value 23% and the pH 3.3. The dispersion is coagulate-free.

COMPARATIVE EXAMPLE 2

For comparison, the procedure followed is exactly as in Example 2 except that in place of the sulfosuccinate 3.5 parts of a 20% strength aqueous solution of an adduct of isooctylphenol with 25 moles of ethylene oxide are employed. The amount of water in feed I is 162.5 parts. The solids content is 62.9%, the LT value 11% and the pH 3.2. The dispersion contains 80 parts of coagulate.

EXAMPLE 3

The procedure followed is as described in Example 1. 200 parts of water are initially introduced into the reaction vessel. Feed I consists of an emulsion of 420 parts of ethyl acrylate, 90 parts of methyl methacrylate, 60 parts of acrylonitrile, 24 parts of methacrylic acid and 13.3 parts of a 45% strength aqueous solution of N-methylolmethacrylamide in 98 parts of water, the emulsifier being a mixture of 4.3 parts of a 35% strength aqueous solution of the sodium salt of the sulfuric acid half-ester of an adduct of p-isooctylphenol with 25 moles of ethylene oxide, and 5 parts of a 60% strength aqueous solution of sodium di-2-ethylhexyl sulfosuccinate.

Feed II contains 3 parts of potassium peroxydisulfate dissolved in 80 parts of water.

2% by volume of feed I and 10% by volume of feed II are introduced into the heated reaction vessel and stirred for 20 minutes. The two feeds I and II are then run in as in Example 1. The solids content of the dispersion obtained is 60.4%, the LT value 35% and the pH 4.5.

The dispersion has good flow, can be filtered and is free from coagulate.

EXAMPLE 4

The procedure described in Example 1 is followed. 200 parts of water and 0.9 part of ammonium peroxydisulfate are initially introduced into the reaction vessel. Feed I consists of an emulsion of 525 parts of 2-ethylhexyl acrylate, 45 parts of methyl methacrylate, 27 parts of methacrylic acid, 6.25 parts of a 48% strength aqueous solution of N-methylolacrylamide and 2 parts of 25% strength ammonia in 145 parts of water, the emulsifier being a mixture of 3.43 parts of a 35% strength aqueous solution of the sodium salt of the sulfuric acid half-ester of an adduct of p-isooctylphenol with 25 moles of ethylene oxide, and 3.43 parts of a 35% strength aqueous solution of the disodium salt of n-octadecyl sulfosuccinate.

Feed II contains 2.1 parts of ammonium peroxydisulfate dissolved in 50 parts of water. 3% by volume of feed I are introduced into the heated reaction vessel and stirred for 15 minutes. Thereafter the two feeds I and II are run in as in Example 1.

The solids content of the dispersion obtained is 59.8%, the LT value 30% and the pH 3.5. The dispersion has good flow, can be filtered and is free from coagulate.

EXAMPLE 5

The procedure described in Example 1 is followed. 120 parts of water are initially introduced into the reaction vessel.

Feed I consists of an emulsion of 366 parts of isobutyl acrylate, 114 parts of tert.-butyl acrylate, 96 parts of styrene, 12 parts of acrylic acid, 12 parts of methacrylic acid and 4 parts of 25% strength ammonia in 175 parts of water, the emulsifier being a mixture of 3.43 parts of a 35% strength aqueous solution of the sodium salt of the sulfuric acid half-ester of an adduct of p-isooctylphenol with 25 moles of ethylene oxide, and 2 parts of a 60% strength aqueous solution of the sodium salt of di-2-ethylhexyl sulfosuccinate.

Feed II contains 3 parts of potassium peroxydisulfate dissolved in 120 parts of water.

5% of feed I and 5% of feed II are introduced into the heated reaction vessel, the mixture is stirred for 20 minutes, and feeds I and II are then run in as in Example 1.

The solids content of the dispersion obtained is 58.5%, the LT value 28% and the pH 4.8. The dispersion is pourable and free from specks and coagulate, and is therefore easily filterable.

EXAMPLE 6

The procedure described in Example 1 is followed. 84.5 parts of water are initially introduced into the reaction vessel, together with 0.2 part of a 35% strength aqueous solution of the sodium salt of the sulfuric acid half-ester of an adduct of p-isooctylphenol with 25 moles of ethylene oxide and 0.34 part of potassium peroxydisulfate. Feed I consists of an emulsion of 461.8 parts of n-butyl acrylate, 57.5 parts of acrylonitrile, 25 parts of acrylic acid and 12 parts of methacrylamide in 210 parts of water, the emulsifier being a mixture of 40 parts of a 35% strength aqueous solution of the sodium salt of the sulfuric acid half-ester of an adduct of p-isooctylphenol with 25 moles of ethylene oxide, and 7.3 parts of a 60% strength aqueous solution of the sodium salt of di-2-ethylhexyl sulfosuccinate.

Feed II contains 1 part of potassium peroxydisulfate and 1.8 parts of sodium peroxydisulfate dissolved in 76 parts of water.

Feeds I and II are run into the heated reaction vessel continuously over 4 hours. Thereafter the procedure of Example 1 is followed.

The solids content of the dispersion obtained is 60.7%, the LT value 33% and the pH 3.9. The dispersion has good flow and is free from specks and coagulate and therefore easily filterable.

EXAMPLE 7

The procedure described in Example 1 is followed. 83 parts of water, 0.65 part of sodium pyrophosphate and 0.3 part of sodium peroxydisulfate are initially introduced into the reaction vessel.

Feed I consists of an emulsion of 525 parts of ethylhexyl acrylate, 78.2 parts of vinyl acetate, 26 parts of ethyl acrylate, 13 parts of styrene and 3.8 parts of acrylic acid in 160 parts of water, the emulsifier being a mixture of 22.3 parts of a 35% strength aqueous solution of the sodium salt of the sulfuric acid half-ester of an adduct of p-isooctylphenol with 25 moles of ethylene oxide, 5.2 parts of a 25% strength aqueous solution of sodium vinylsulfonate, and 1 part (solid) of sodium di-2-ethylhexyl sulfosuccinate.

Feed II contains 5 parts of sodium peroxydisulfate in 70 parts of water. The initial charge is heated to 88° C. and at this temperature feeds I and II are added continuously over 4 hours. Thereafter the procedure described in Example 1 is followed.

The solids content of the dispersion is 65.8%, the LT value 30% and the pH 3. The dispersion has a low viscosity and is filterable without use of pressure.

We claim:

1. A process for the preparation of a concentrated polyacrylate dispersion consisting of polymerization of 65-97 percent by weight of acrylic or methacrylic acid esters of alkanols of 1 to 8 carbon atoms, 0.3-10 percent by weight of α, β-monoolefinically unsaturated monocarboxylic and/or dicarboxylic acids of 3 to 5 carbon atoms and/or their amides and 0-25 percent by weight of monomers from the group consisting of styrene, acrylonitrile, vinyl acetate and vinyl chloride, in aqueous emulsion at pH 2-6 in the presence of 0.01-5.0 percent by weight, based on monomers, of the sulfuric acid half-ester of an adduct of an alkylphenol, alkyl being of 8 to 9 carbon atoms, with 5-50 moles of ethylene oxide and 0.01-1 percent by weight, based on monomers, of a dialkyl sulfosuccinate, alkyl being of 6 to 18 carbon atoms, and conventional water-soluble free radical initiators at 30°-95° C., by the emulsion feed process.

2. The process for the preparation of a concentrated polyacrylate dispersion according to claim 1, wherein 65-97 percent by weight of acrylic or methacrylic acid esters of alkanols of 1 to 8 carbon atoms, 0.5-7.5 percent by weight of α, β-monoolefinically unsaturated monocarboxylic and/or dicarboxylic acids of 3 to 5 carbon atoms and/or their amides and 0–25 percent by weight of monomers from the group consisting of styrene, acrylonitrile, vinyl acetate and vinyl chloride are polymerized in aqueous emulsion at pH 3–5 in the presence of 0.1–0.5 percent by weight, based on monomers, of the sulfuric acid half-ester of an adduct of an alkylphenol, alkyl being of 8 to 9 carbon atoms, with 20–30 moles of ethylene oxide and 0.1–0.5 percent by weight, based on monomers, of di-2-ethylhexyl sulfosuccinate and conventional water-soluble free radical initiators at 50°–85° C. by the emulsion feed process.

* * * * *